(12) United States Patent
Liestenfeltz et al.

(10) Patent No.: US 12,371,920 B2
(45) Date of Patent: Jul. 29, 2025

(54) TELESCOPING MOBILE POLE SYSTEM

(71) Applicant: Rapid IP Holdings, LLC, Scottsdale, AZ (US)

(72) Inventors: Kurt Liestenfeltz, Scottsdale, AZ (US);
Timothy McHugh, Hooksett, NH (US);
Brian Gibson, Fairmount, IN (US);
Phillip D. Gibson, Fairmount, IN (US);
Frank P. Liestenfeltz, Marion, IN (US)

(73) Assignee: Rapid IP Holdings, LLC, Scottsdale, AZ (US)

( * ) Notice: Subject to any disclaimer, the term of this patent is extended or adjusted under 35 U.S.C. 154(b) by 0 days.

(21) Appl. No.: 18/641,085

(22) Filed: Apr. 19, 2024

(65) Prior Publication Data
US 2024/0352757 A1    Oct. 24, 2024

Related U.S. Application Data

(60) Provisional application No. 63/497,676, filed on Apr. 21, 2023.

(51) Int. Cl.
| | |
|---|---|
| *E04H 12/18* | (2006.01) |
| *B60P 3/00* | (2006.01) |
| *E04H 12/34* | (2006.01) |
| *H02B 1/01* | (2006.01) |
| *E04H 12/08* | (2006.01) |

(52) U.S. Cl.
CPC .............. *E04H 12/182* (2013.01); *B60P 3/00* (2013.01); *E04H 12/345* (2013.01); *H02B 1/01* (2013.01); *E04H 12/08* (2013.01)

(58) Field of Classification Search
CPC .......... H02B 1/01; H02B 1/011; H02B 1/012; B60P 3/00; E04H 12/345; E04H 12/182; E04H 12/08
USPC ......... 174/45 R, 40 R, 68.1, 68.3, 260, 70 C
See application file for complete search history.

(56) References Cited

U.S. PATENT DOCUMENTS

| | | | | |
|---|---|---|---|---|
| 3,882,964 A * | 5/1975 | Schellenberg | .......... | B66F 11/04 182/127 |
| 5,537,125 A * | 7/1996 | Harrell, Jr. | ........... | H01Q 1/1235 52/118 |
| 6,446,408 B1 * | 9/2002 | Gordin | ................... | E04H 12/182 52/745.18 |
| 6,460,795 B1 * | 10/2002 | Brown, Jr. | ........... | H01Q 1/3216 242/378.2 |
| 6,692,142 B1 * | 2/2004 | Gordin | .................. | E04H 12/182 362/418 |
| 6,888,512 B1 * | 5/2005 | Daigler | ................ | H01Q 1/1242 343/878 |
| 7,642,987 B2 * | 1/2010 | Newman | .............. | H01Q 1/1242 343/874 |
| 8,439,534 B1 * | 5/2013 | Roe | ....................... | F21V 29/763 362/418 |

(Continued)

*Primary Examiner* — Angel R Estrada
(74) *Attorney, Agent, or Firm* — SoCal IP Law Group LLP; Mark Andrew Goldstein

(57) ABSTRACT

There is disclosed a mobile pole system having a temporary utility pole and a mobile structure. The temporary utility pole has a telescoping mast with at least one bracket coupled thereto to receive wires, cables or an item utility equipment. The telescoping mast is formed by a plurality of segments slidably engaged with each succeeding segment of the plurality of segments. The mobile structure has a plurality of supporting members extendable to stabilize the mobile pole system.

15 Claims, 14 Drawing Sheets

(56) References Cited

U.S. PATENT DOCUMENTS

| | | | | |
|---|---|---|---|---|
| 8,481,851 B2 * | 7/2013 | Higby | .................... | H02G 13/00 |
| | | | | 174/2 |
| 10,847,961 B2 * | 11/2020 | Behr | ...................... | H02G 13/80 |
| 11,332,953 B2 * | 5/2022 | Williamson | .......... | E04H 12/182 |
| 11,993,460 B2 * | 5/2024 | Wilson | ................... | E04G 21/16 |
| 12,006,647 B2 * | 6/2024 | Jones | ................. | E04H 12/2238 |
| 2003/0025791 A1 * | 2/2003 | Kaylor | ............. | G08B 13/19628 |
| | | | | 348/E7.086 |

* cited by examiner

TELESCOPING MOBILE POLE SYSTEM

RELATED APPLICATION INFORMATION

This patent claims priority from provisional patent application No. U.S. 63/497,676 filed Apr. 21, 2023, entitled TELESCOPING MOBILE POLE SYSTEM, the contents of which are included by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

This disclosure relates to utility poles and structures supporting overhead cables, wires, lines and related equipment such as electrical power lines, telephone lines, media cables, fiber optic cables, circuit phase conductors, transformers and other related equipment. Utility poles and structures supporting overhead cables, wires, lines and related equipment are replaced periodically due to damage, weather events and utility maintenance. Pole replacement requires skilled labor and special equipment. A weather event damaging utility poles, overhead cables, wires, lines and related equipment constrains or delays restoration crews and equipment needed to perform service or replacement of utility poles, overhead cables, wires, lines and related equipment.

Mobile pole systems are needed to provide temporary pole support structures that provide temporary pole support or replacement for electrical power lines and other utilities to expedite power restoration, particularly during and resulting from weather events or abnormal or emergency situations such as vehicular accidents. Temporary pole structures that facilitate restoration of utilities by supporting utility wires and equipment until a permanent replacement pole can be installed at that location are needed to more readily provide needed electrical and other services to utility customers.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Mobile pole systems used to provide temporary pole support structures are described herein. In one embodiment, the mobile pole system includes a telescoping pole and mobile structure used to provide temporary pole support for overhead cables, wires, lines and related equipment such as electrical power lines, telephone lines, media cables, fiber optic cables, circuit phase conductors, transformers and other related equipment. The mobile pole system described herein provides improved and optimally configured temporary pole structures that facilitate restoration of utilities by supporting utility wires and equipment until a permanent replacement pole can be installed at that location. The mobile pole system is designed and constructed to enable utilities to expedite power and other utility restoration, particularly during and after weather events or abnormal or emergency situations such as vehicular accidents. The mobile pole system also enables utilities to expedite power restoration for outages involving underground utility infrastructure while permanent repairs are delayed resulting from excavation clearances and additional measures for permanent restoration. The mobile pole system also facilitates restoration of utilities in specialized, unique and urban locations with challenging space limitations while a permanent repair is delayed. The mobile pole system also provides temporary support of electrical and other utility or telecommunication lines or equipment such as RF antennas. The mobile pole system described herein enables a faster and more efficient response and restoration of services until a permanent utility pole or other infrastructure can be installed for emergent and non-emergent purposes.

Figure 1:
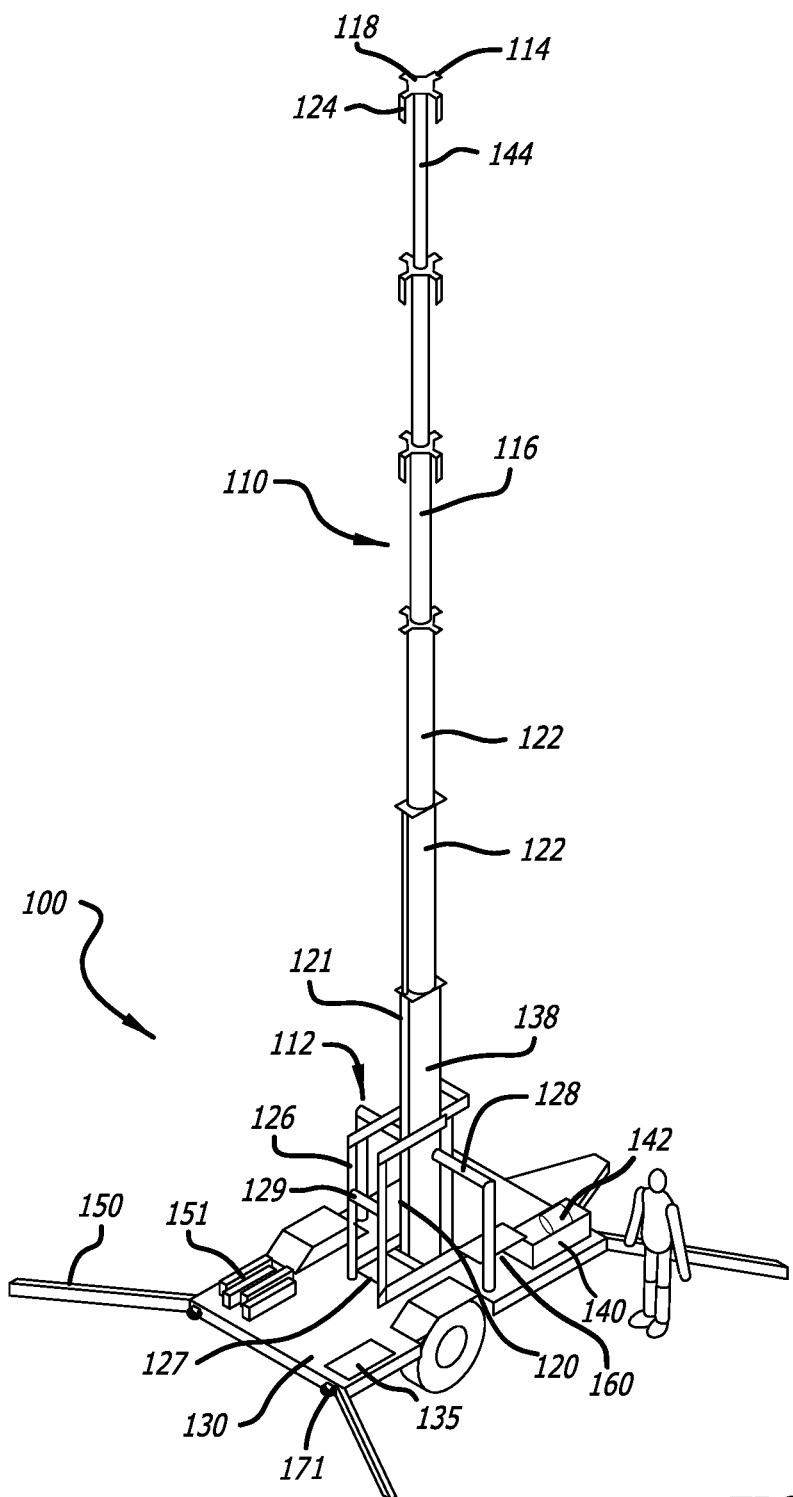
FIG. 1 is a rear perspective view of a mobile pole system with a temporary utility pole in a vertical extended position.
Figure 2:
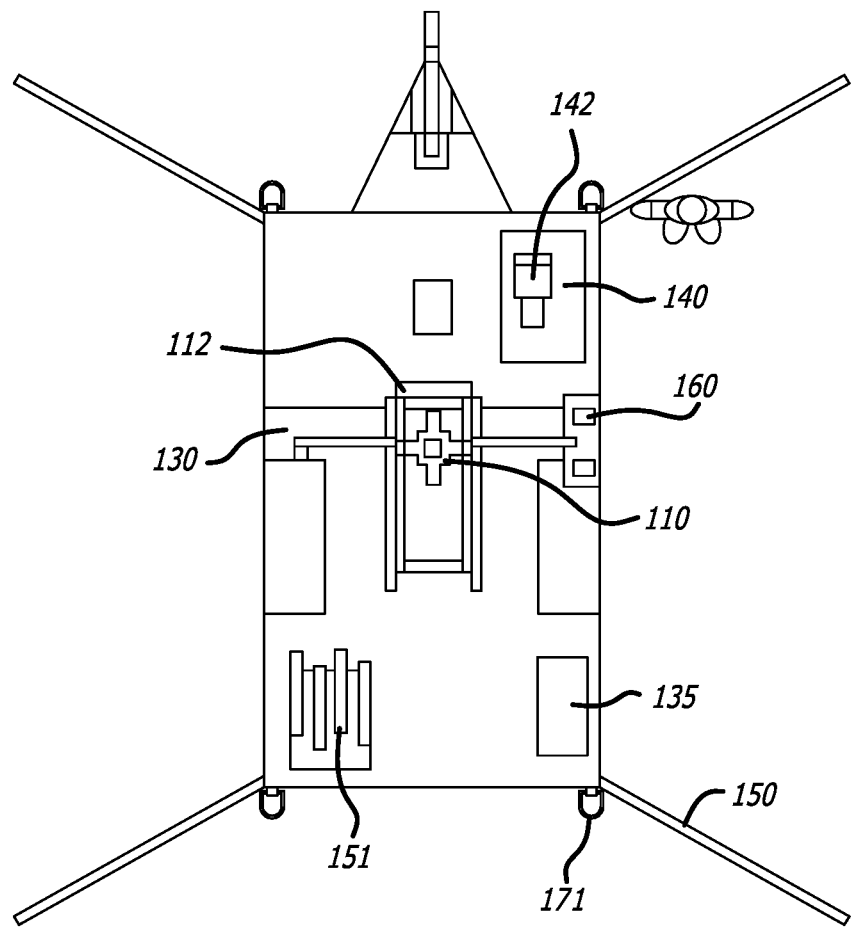
FIG. 2 is a top view of the mobile pole system with the temporary utility pole in a vertical extended position.

Referring now to FIGS. 1 and 2, a mobile pole system 100 is shown having a temporary utility pole 110 and a mobile structure 130. The temporary utility pole 110 may be a telescoping mast formed by a plurality of telescoping segments 122 each interconnected to one another. Each segment of the plurality of telescoping segments 122 are of different dimensions such that the lowest segment 138 of the plurality of telescopic segments 122 is larger in size than an upper most segment 144 of the plurality of telescopic segments 122. The plurality of telescoping segments 122 are formed such that each segment of the plurality of telescoping segments 122 may reside within a subsequent segment of the plurality of telescoping segments 122 when the temporary utility pole 110 is retracted. Conversely, when the temporary utility pole 110 is extended each segment of the plurality of telescoping segments 122 cascades one atop the other. Each segment of the plurality of telescoping segments 122 may have an internal shoulder located at the base of each segment of the plurality of segments 122, such that when each segment of the plurality of telescopic segments 122 is extended to a fully extended position, the internal shoulder engages the base of the subsequent segment of the plurality of telescopic segments 122 creating a catch. For example, as the plurality of segments 122 is extended, the shoulder of each respective segment prevents a subsequent segment from being pulled away from the plurality of segments 122. In having each segment of the plurality of telescopic segments 122 engage one another, the temporary utility pole 110 extends vertically upward a fixed length. The temporary utility pole 110 is constructed to extend to the typical height of a permanent utility pole. For example, the mobile temporary utility pole may be able, but is not limited, to extend from a height of approximately 11 feet to a maximum extended height of approximately 50 feet. It is to be understood that, in other embodiments, temporary utility pole 110 may extend beyond 50 feet, such as, for example, to 50, 58, 60, 72 and 80 feet. The temporary utility pole 110 may be extended to its maximum length to achieve maximum height, and may be adjusted or set to extend a preferred height that is between the minimum height and the maximum height, depending on the embodiment.

The plurality of telescopic segments 122 may be but is not limited to being rectangular or cylindrical in circumferential or perimeter shape. The plurality of telescopic segments 122 may have a shape suitable for extending the temporary utility pole 110 and bearing the weight of utilities or power lines which it supports. The temporary utility pole may be a telescoping mast. The plurality of telescopic segments 122 may be hydraulically actuated or may utilize a series of rollers and cables (not shown), to allow full extension and/or retraction of the plurality of telescoping segments 122 and to allow partial extension and/or retraction of telescoping segments 122 to adjustable heights. It is to be understood that the plurality of telescoping segments 122 may be actuated by alternative methods, capable of fully and partially extending and/or retracting the plurality of telescoping segments 122. For example, extension and retraction of the temporary utility pole 110 may be realized through installed hydraulic actuators that power pistons, rollers, and/or cables between the plurality of telescoping segments 122. In the embodiment shown in FIG. 1, a hydraulic piston 121 is secured to the lowest segment 138 at one end and at the other end is secured to the subsequent segment of the plurality of telescoping segments 122 following the lowest segment 138. As the hydraulic piston 121 is engaged, the hydraulic piston 121 extends upward and engages with internal rollers and cables interconnect with the subsequent plurality of telescoping segments 122, causing the plurality of telescoping segments 122 to extend upward. Conversely, when the hydraulic piston 121 is disengaged, the hydraulic piston 121 retracts which then disengages the internal rollers and cables, retracting the plurality of telescoping segments 122 downward.

The mobile pole system 100 also includes at least one bracket 114 for holding, supporting, and otherwise providing for the mounting of overhead cables and wires, as well as utility equipment. The at least one bracket 114 may be interposed between the telescoping segments 122. Each such bracket 114 extends and/or retracts with the respective plurality of telescoping segments 122 to which it is connected. The 114 may be formed to have a central disk 118 expanding centrally outward. The at least one bracket 114 may have at least one mounting plate 124. The mounting plate 124 extends outwardly from the central disk 118 and then extends bilaterally upward and downward. The mounting plate 124 may have a slotted hole 116 disposed therein. The slotted hole 116 is bored through the mounting plate 124, such that cables, wires and utility equipment may be fastened to the mounting plate 124 (see also FIGS. 9-10). One or more slotted holes 116 may be included in the mounting plate 124. The bracket 114 may have one or more mounting plates 124 such that the cables, wires and utility equipment may be mounted on any side of the bracket 114. For example, the bracket 114 may have a mounting plate on all four sides of a rectangular shaped temporary utility pole 110 such that cables, wires and utility equipment may be fastened to the at least one mounting plate 124 on any side of the temporary utility pole 110. A benefit of having multiple mounting plates 124 is that the configuration enables the mobile pole system 100 to be positioned in any needed orientation and enables wires, cables and utility equipment to be mounted on any side such that the mobile pole system 100 does not need to be moved or re-oriented. In this way, the mobile pole system 100 decreases the time needed to restore power and/or other utility connections used with utility poles as the temporary utility pole 110 is immediately deployable and bypasses the need to shut off power for extended periods of time.

Referring again to FIG. 1, the temporary utility pole 110 may be removably secured to the mobile structure 130 by the mounting structure 112. The mounting structure 112 is formed to provide the temporary utility pole 110 with structural support. The mounting structure 112 may be formed by a vertical structure 126 and a lateral structure 128. The vertical structure 126 is formed by a plurality of legs 127 that extend upward from the mobile structure 130. The plurality of legs 127 may have a plurality of crossbar supports 129 interposed therein. A benefit of the plurality of crossbar supports 129 is increased structural stability. The temporary utility pole 110 is pivotally secured to the rear of the vertical structure 126. When the temporary utility pole 110 is in the horizontal position, the front portion of the vertical structure 126 acts as a support rest for the temporary utility pole 110 to prevent it from continuing rotation. For example, if the temporary utility pole 110 continues to rotate past the vertical structure 126, the temporary utility pole 110 would meet the base of the mobile structure 130, potentially compromising space and safety. As shown in FIG. 1, extending from the rear portion of the vertical structure 126 is the lateral structure 128. The lateral structure 128 extends outward from the vertical structure 126 then downward to the mobile structure 130. The lateral structure 128 provides increased structural support for the temporary utility pole 110.

Figure 3:
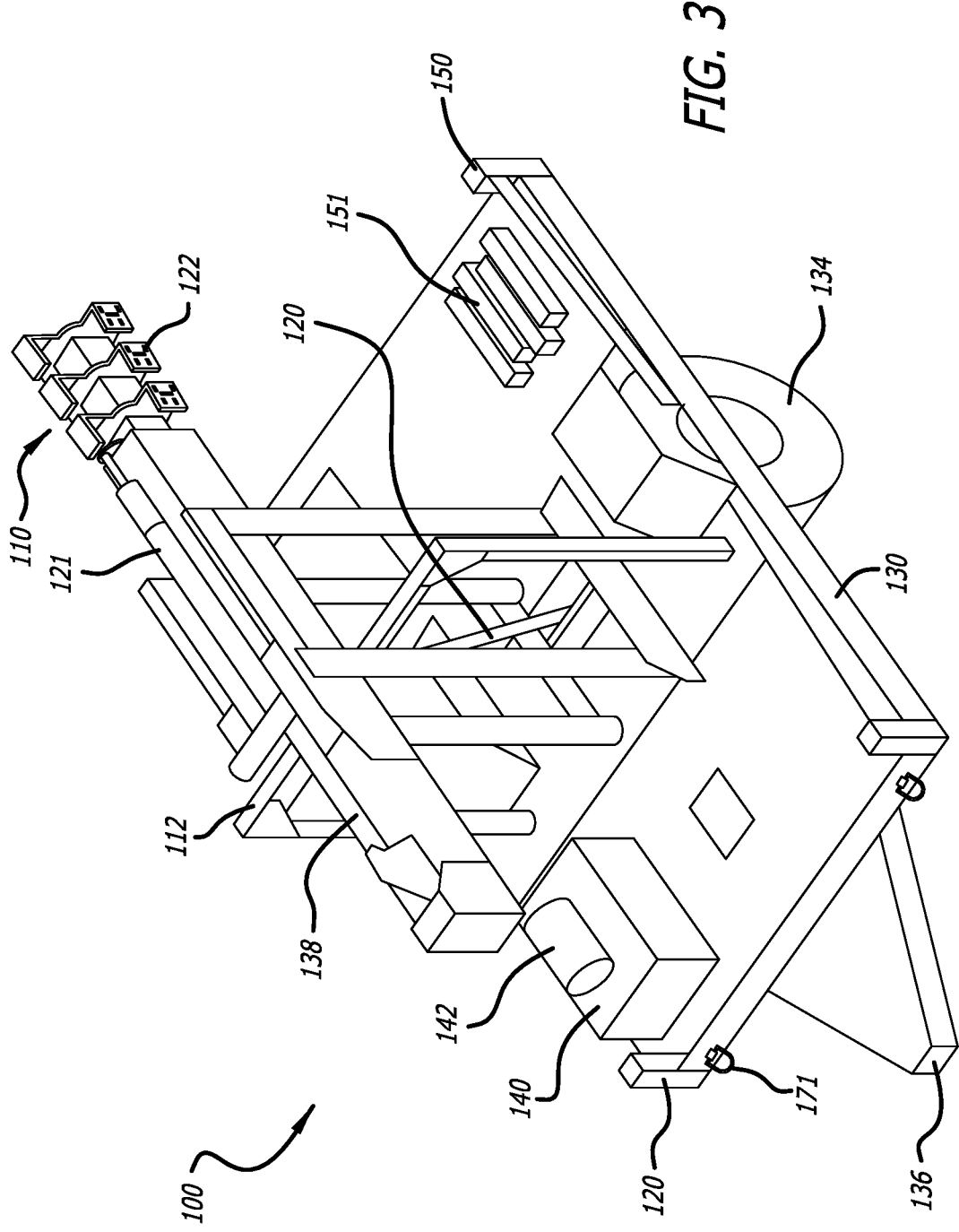
FIG. 3 is a front perspective view of the mobile pole system with the temporary utility pole in a horizontal collapsed position.

Referring now to FIG. 3, the temporary utility pole 110 may be hingedly secured to the mounting structure 112, such that the temporary utility pole 110 may pivot or move from a vertical position to a horizontal position. The temporary utility pole 110 may include a hinge at or near the center of a lowest segment 138 of the plurality of telescoping segments 122. The temporary utility pole 110 may be rotated by a hydraulic piston 120 mounted to the mobile structure 130 at one end and pivotally attached to the distal end of the lowest segment 138 of the plurality of telescoping segments 122. In this way, when the hydraulic piston 120 is engaged, the temporary utility pole 110 may pivot about its center axis moving from a horizontal to a vertical position. Conversely, when the hydraulic piston 120 is disengaged, the temporary utility pole 110 may pivot about the center axis moving from a vertical position to a horizontal position.

A benefit of permitting the temporary utility pole 110 to be in a horizontal position is that the mobile pole system 100 becomes more compact and safer for transportation allowing for quick and safe mobility. In a retracted and horizontal configuration, the mobile pole system 100 can be easily maneuvered under structures, trees and in environments with limited height clearances, such that after the mobile pole system 100 safely traverses beyond the low structures, trees or height limited areas, the temporary utility pole 110 may then be oriented in a vertical upright position and extended vertically upward. For example, during power or utility outage, the mobile pole system 100 in a retracted and horizontal configuration can be easily positioned under existing distribution and transmission lines, cables and utility equipment and, when in a desired location may then be oriented in a vertical upright position and extended vertically upward into place to hold lines, cables, circuit phase conductors, transformers, and other utility equipment in place while repairs are made.

The mobile structure 130 may in some embodiments include a power source 140. The power source 140 may be but is not limited to: electrical motor, generator powered by oil, gas or diesel, and/or an internal combustion engine and may also include an electric battery. It is to be understood that the mobile pole system 100 may use a combination or one or more power sources 140 to operate the mobile pole system 100. For example, in one embodiment, the mobile structure 130 includes an electrical motor, a hydraulic actuator and an electric battery mounted on the mobile structure 130 where the battery powers the electrical motor. The mobile structure 130 may include a hydraulic pump system 142 to operate the temporary utility pole 110. This embodiment of mobile pole system 100 may include an electric generator mounted on the mobile structure 130 for recharging the battery. The electric generator may be an internal combustion engine. In one example, a battery charger may be mounted on the mobile structure and may be connected to an electric generator or direct electric service for recharging the battery. When the mobile pole system 100 includes a hydraulic motor, the hydraulic motor may contain ports for auxiliary power sources and connections to an included hydraulic pump and included internal combustion engine to allow for an alternative power source to operate the mobile pole system 100. The mobile structure 130 may also include a battery compartment 135 for storing additional batteries for controlling various electronics on the mobile pole system 100. In another embodiment, solar panels may be provided on the mobile structure to provide for solar charging of a battery included on the mobile structure.

Referring again to FIGS. 1 and 2, the mobile structure 130 in various embodiments includes a plurality of support members 150 formed by foldable outriggers that may be pivotally secured to the mobile structure 130. The plurality of support members 150 extend from each corner of the mobile structure 130. The plurality of support members 150 have a manual jack 151 that is secured to the distal end of the plurality of support members 150. The manual jack 151 may be stored on top of the mobile structure 130. When the manual jack 151 is secured to each of the plurality of support members 150 an operator may then level the mobile pole system 100 through each one of the manual jack 151 and the plurality of support members 150. It is to be understood that the plurality of support members 150 may also be hydraulically actuated and may be connected to the power source 140 or may have a separate power source that is electrically isolated. The plurality of support members 150 provide structural support to the mobile pole system 100 when fully extended. The plurality of support members 150 may be self-leveling. For example, downed power lines may be in an area having an uneven surface, the self-leveling plurality of support members 150 can be used to level the mobile pole system 100 to allow the temporary utility pole 110 to be extended safely vertically upward and provide support to the utility lines. The plurality of support members 150 may retract inwardly to create a condensed or reduced size profile for ease of transportation and mobility of the mobile pole system 100.

The mobile pole system 100 may include a control unit 160 mounted to the mobile structure 130. The control unit 160 is used to operate the various modular components of the mobile pole system 100 including but not limited to extending/retracting the temporary utility pole 110, adjusting the rotational orientation of the temporary utility pole 110 and aligning the plurality of support members 150. In one embodiment, the control unit 160 includes a wireless communications unit separate from the mobile structure 130 that includes a radio frequency transmitter for wirelessly controlling or otherwise sending control instructions to the mobile pole system 100 including the mobile temporary utility pole 110 and the plurality of support members 150. In another embodiment, the control unit 160 includes a wired communications unit that provides for wired control the mobile structure 130. One or more light units (not shown) may be secured to the distal ends and/or other areas of the mobile structure 130. The light units may have but are not limited to a strobe light, spotlight or a combination thereof. A benefit of the light units is to serve as a visual safety indicator and/or be a light source. For example, when an operator is extending or retracting the plurality of support members or extending the temporary utility pole 110, some or all of the light units may be turned on to serve as a precautionary measure to passersby to indicate the mobile pole system 100 is in use. Further, when the light unit has one or more spotlights, an operator may manipulate the spotlight to illuminate the mobile pole system 100 and/or the street or other surface in dimly lit environments. The light unit is connected to the power source 140 and control unit 160. One or more tie downs 171 may be secured to the distal ends and/or other areas of the mobile structure 130. A benefit of the tie downs 171 is the ability to secure loose items to the mobile structure 130.

Figure 13:
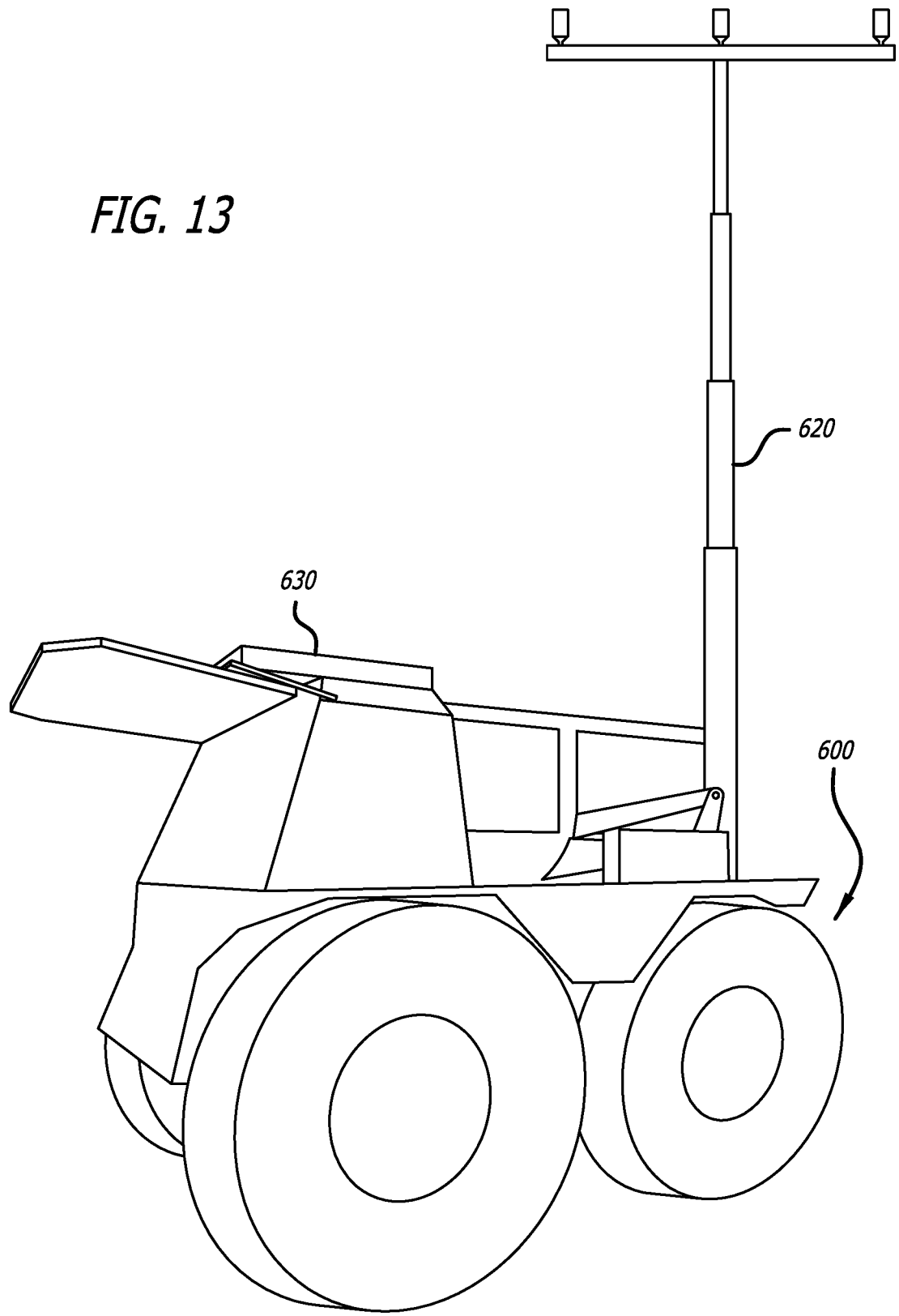
FIG. 13 is a front perspective view of the mobile pole system with the temporary utility pole in a vertical extended position.
Figure 14:
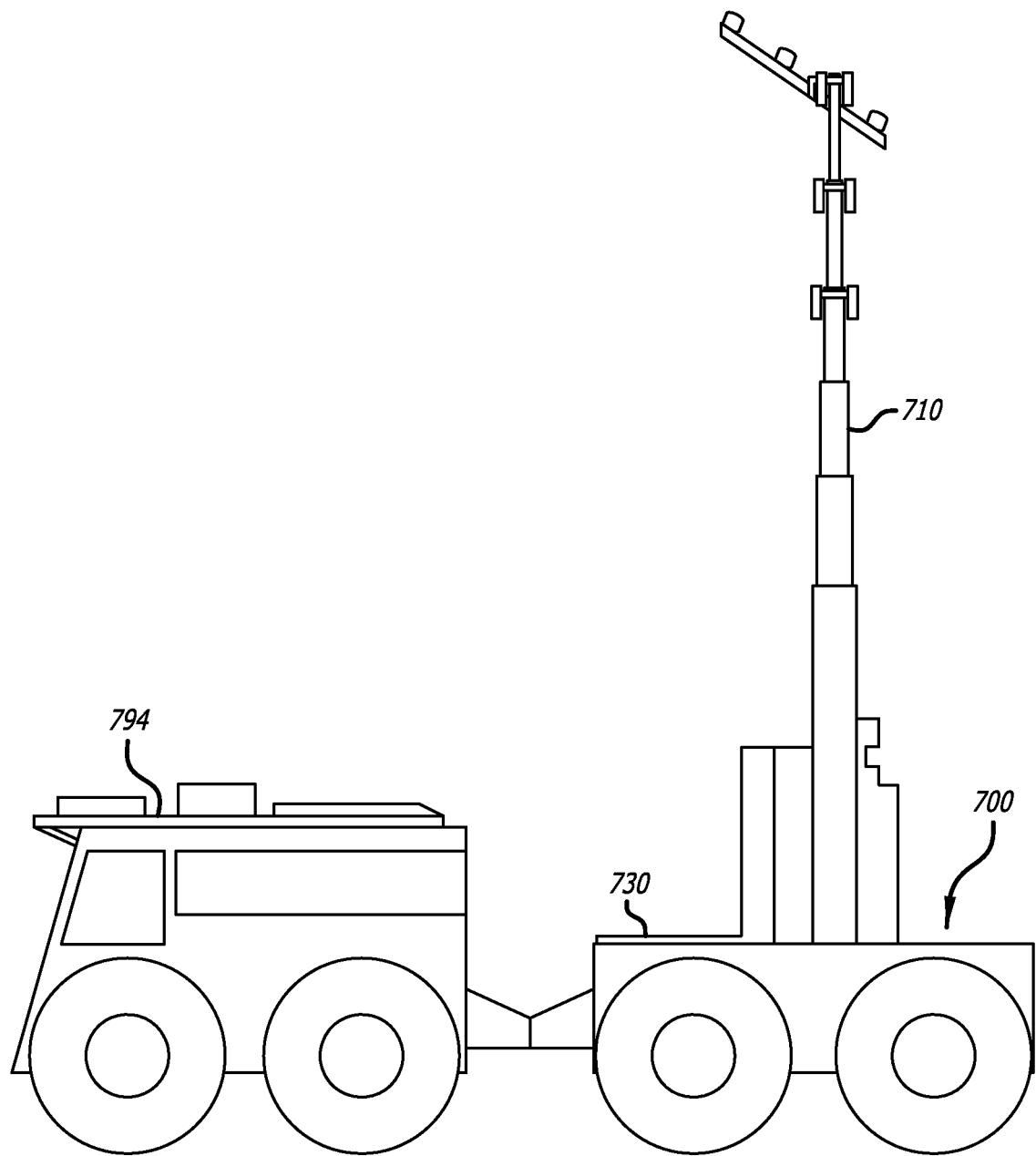
FIG. 14 is a left view of the mobile pole system with the temporary utility pole in a vertical extended position.

In the embodiment of the mobile pole system 100 shown in FIGS. 1, 2 and 3, the mobile structure 130 has a flatbed, a set of wheels 134 and a trailer hitch 136. In other embodiments, the mobile structure may be but is not limited to a wheeled or tracked vehicle or trailer. For example, the mobile structure 130 may be an all-terrain vehicle that may also be amphibious as shown in FIGS. 13-14. Referring back to FIG. 3, A benefit of the mobile structure 130 being a wheeled or tracked vehicle is the ease of mobility of the mobile pole system 100 in varying terrains, environments and weather. For example, power lines in more rural areas may be inaccessible by common vehicles or trailers and may require specialized vehicles such as an all-terrain vehicle to access the areas and service power and other lines with the mobile pole system 100. The specialized vehicle embodiments of the mobile pole system 100 are also useful in areas with large amounts of snow, mud and pooled water.

The mobile pole system 100 and, in particular, the mobile structure 130 and the temporary utility pole 110 may be constructed using durable and corrosion resistant materials such as but not limited to aircraft quality aluminum and stainless-steel materials as well as other sufficiently strong and resilient materials.

Referring now to FIGS. 4, 5, 6, 7 and 8, an additional embodiment mobile pole system 200 is shown. The mobile pole system 200 includes a temporary utility pole 210 and a mobile structure 230. The temporary utility pole 210 may be formed by a plurality of telescoping segments 222 each interconnected. Each segment of the plurality of telescopic segments 222 are of different dimensions such that a lowest segment 238 of the plurality of telescopic segments 222 is larger in size than an upper most segment 244 of the plurality of telescopic segments 222. The plurality of telescoping segments 222 are arranged such that each segment of the plurality of telescoping segments 222 may reside within a subsequent segment of the plurality of telescoping segments 222 when the temporary utility pole 210 is retracted. Conversely, when the temporary utility pole 210 is extended each segment of the plurality of telescoping segments 222 stacks one atop the other. The temporary utility pole 210 may be considered a retractable, extendable telescoping mast formed by the plurality of telescoping segments 222. As shown, in FIGS. 4, 5, 6, 7 and 8, the temporary utility pole 210 is in a retracted and horizontal position. Each segment of the plurality of telescopic segments 222 engage one another such that the temporary utility pole 210 may extend vertically upward a fixed length. The temporary utility pole 210 is constructed to extend to the typical height of a permanent utility pole. For example, the mobile temporary utility pole may be able, but is not limited, to extend from a height of approximately 11 feet to a maximum extended height of approximately 50 feet. It is to be understood that temporary utility pole 210 may extend beyond 50 feet, such as, for example, to 58, 63, 71 and 80 feet. The temporary utility pole 210 may be extended to its maximum length to achieve maximum height, and may be adjusted or set to extend a preferred height that is between the minimum height and the maximum height, depending on the embodiment.

The plurality of telescopic segments 222 may be hydraulically actuated, and/or may utilize a series of rollers and cables (not shown), to allow full extension and/or retraction of the plurality of telescopic segments 222 and to allow full and partial extension and/or retraction of telescoping segments 222. The plurality of telescopic segments 222 may be actuated by alternative methods capable of fully and partially extending and retracting the plurality of telescopic segments 222. For example, extension and retraction of the temporary utility pole 210 may be realized through installed hydraulic actuators which are electrically isolated from energized surfaces that power pistons, rollers and cables between the plurality of telescoping segments 222. In the embodiment shown in FIG. 7, a hydraulic piston 221 is secured to the lowest segment 238 at one end and at the other end is secured to the subsequent segment of the plurality of telescoping segments 222 following the lowest segment 238. As the hydraulic piston 221 is engaged, the hydraulic piston 221 extends upward and engages with internal rollers and cables that interconnect with the subsequent plurality of telescoping segments 222, causing the plurality of telescoping segments 222 to extend upward. Conversely, when the hydraulic piston 221 is disengaged, the hydraulic piston 221 retracts which then disengages the internal rollers and cables, retracting the plurality of telescoping segments 222 downward.

The temporary utility pole 210 may be hingedly secured to a mounting structure 212, such that the temporary utility pole 210 may pivot from a vertical position to a horizontal position. The temporary utility pole 210 may be coupled with or include a hinge at or near the center of the lowest segment 238 of the plurality of telescoping segments 222. The temporary utility pole 210 may be rotated by a hydraulic piston 220 mounted to the mobile structure 230 at one end and pivotally attached to the distal end of the lowest segment 238 of the plurality of telescoping segments 222. In this way, when the hydraulic piston 220 is engaged, the temporary utility pole 210 may pivot from a horizontal to vertical position or, conversely, when the hydraulic piston 220 is disengaged, the temporary utility pole 210 may pivot about from a vertical position to a horizontal position.

The temporary utility pole 210 further may have an at least one bracket 214 for holding, supporting and otherwise providing for the mounting of overhead cables, wires, and utility equipment. The bracket 214 may be interposed between adjoining segments of the plurality of telescoping segments 222, such that each bracket 214 extends and/or retracts with the respective plurality of telescoping segments to which it is connected. The bracket 214 may have a central disk 218 expanding centrally outward. The bracket 214 may have one or more mounting plates 224. The mounting plate 224 extends outwardly from the central disk 218. The mounting plate 224 then extends bilaterally upward and downward. The mounting plate 224 may have a slotted hole 216 disposed within. The slotted hole is bored through the mounting surface, so that a cables, wires and other utility equipment may be fastened or otherwise attached to the mounting plate 224 (see also FIGS. 9-10). The bracket 214 may have multiple mounting plates 224 such that the wires, cables and utility equipment may be mounted on any side of the bracket 214.

The temporary utility pole 210 may be removably secured to the mobile structure 230 by the mounting structure 212. The mounting structure 212 provides the temporary utility pole 210 with structural support. The mounting structure 212 may be formed by a vertical structure 226 and a lateral structure 228. The vertical structure 226 is formed by a plurality of legs 227 that extend upward from the mobile structure 230. The plurality of legs 227 may have a plurality of crossbar supports 229 interposed therein. A benefit of the plurality of crossbar supports 229 is increased structural stability. The temporary utility pole 210 is pivotally secured to the rear of the vertical structure 226. When the temporary utility pole 210 is in the horizontal position, the front portion of the vertical structure 226 acts as a support rest for the temporary utility pole 210 to prevent it from continuing rotation. For example, if the temporary utility pole 210 continues to rotate past the vertical structure 226, the temporary utility pole 210 would meet the base of the mobile structure 230, potentially compromising space and safety. A locking tab 231 is secured to the lowest segment 238. The locking tab 231 having a pin hole 233 bored through the center, such that when the temporary utility pole 210 is in the vertical position, the locking tab 231 may mate with a second locking tab secured to the mobile structure 230 (not shown) and fastened with a locking pin (not shown) that is inserted into the pin hole 233. In this way, the temporary utility pole 210 may be secured in the vertical position. For example, if the hydraulic piston 220 fails, the locking tab 231 secured with the second locking tab by a pin may prevent the rotation of the temporary utility pole 210 from rotating back into the horizontal position, thus increasing safety.

Figure 6:
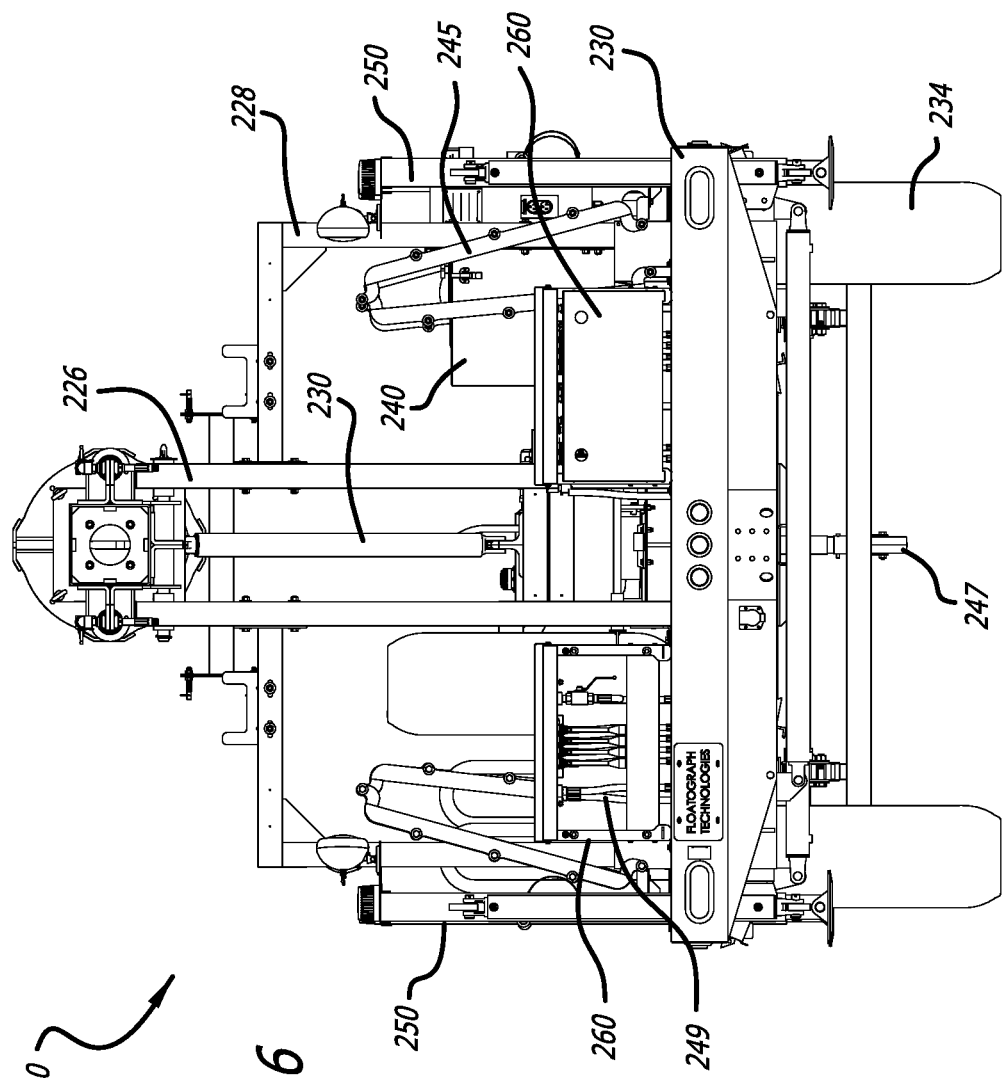
FIG. 6 is a rear view of the mobile pole system with the temporary utility pole in the horizontal collapsed position.

As shown in FIG. 6, extending from the rear portion of the vertical structure 226 is the lateral structure 228. The lateral structure 228 extends outward from the vertical structure 226 then downward to the mobile structure 230. The lateral structure 228 provides increased structural support for the temporary utility pole 210.

Figure 4:
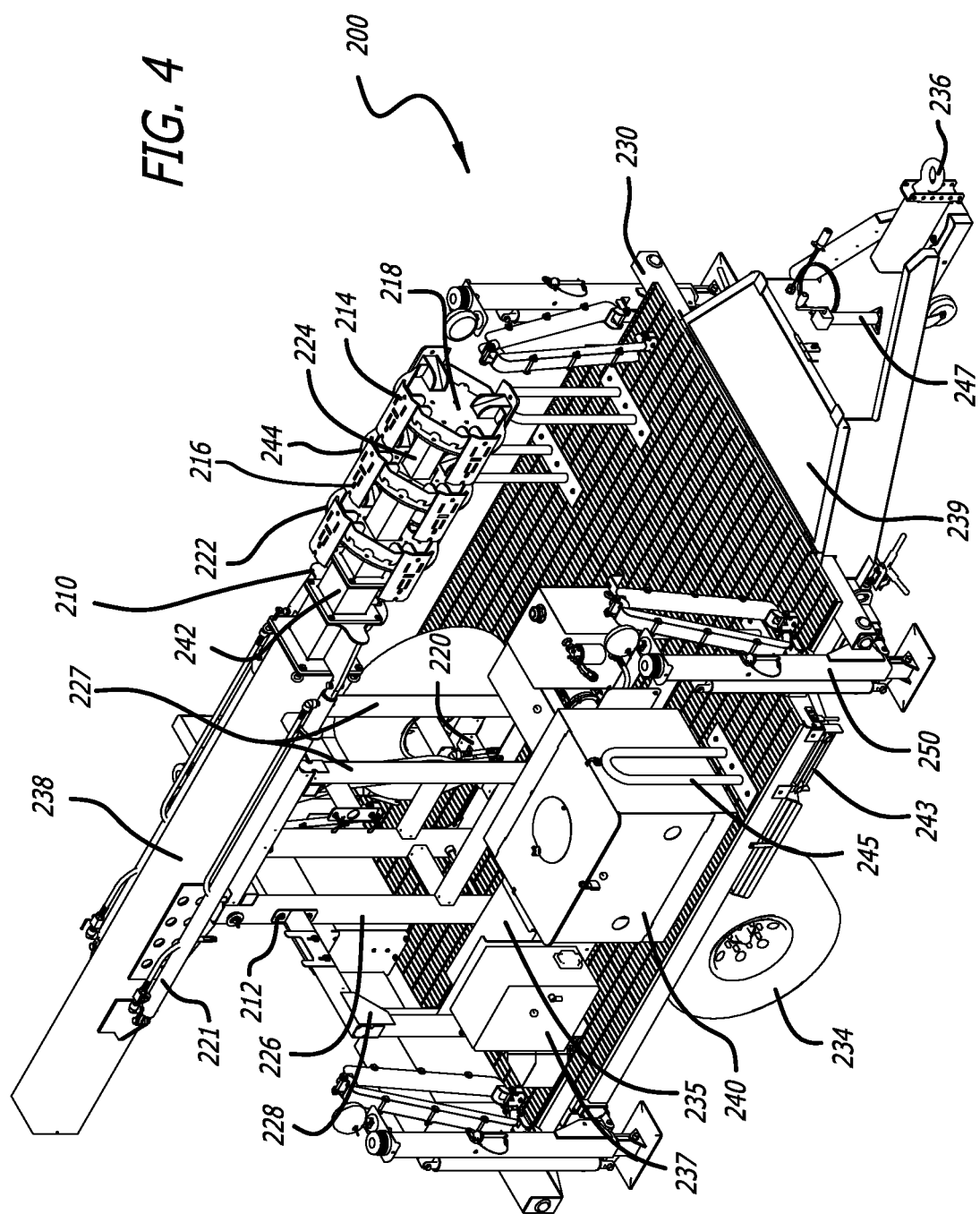
FIG. 4 is a front perspective view of the mobile pole system with the temporary utility pole in a horizontal collapsed position.
Figure 5:
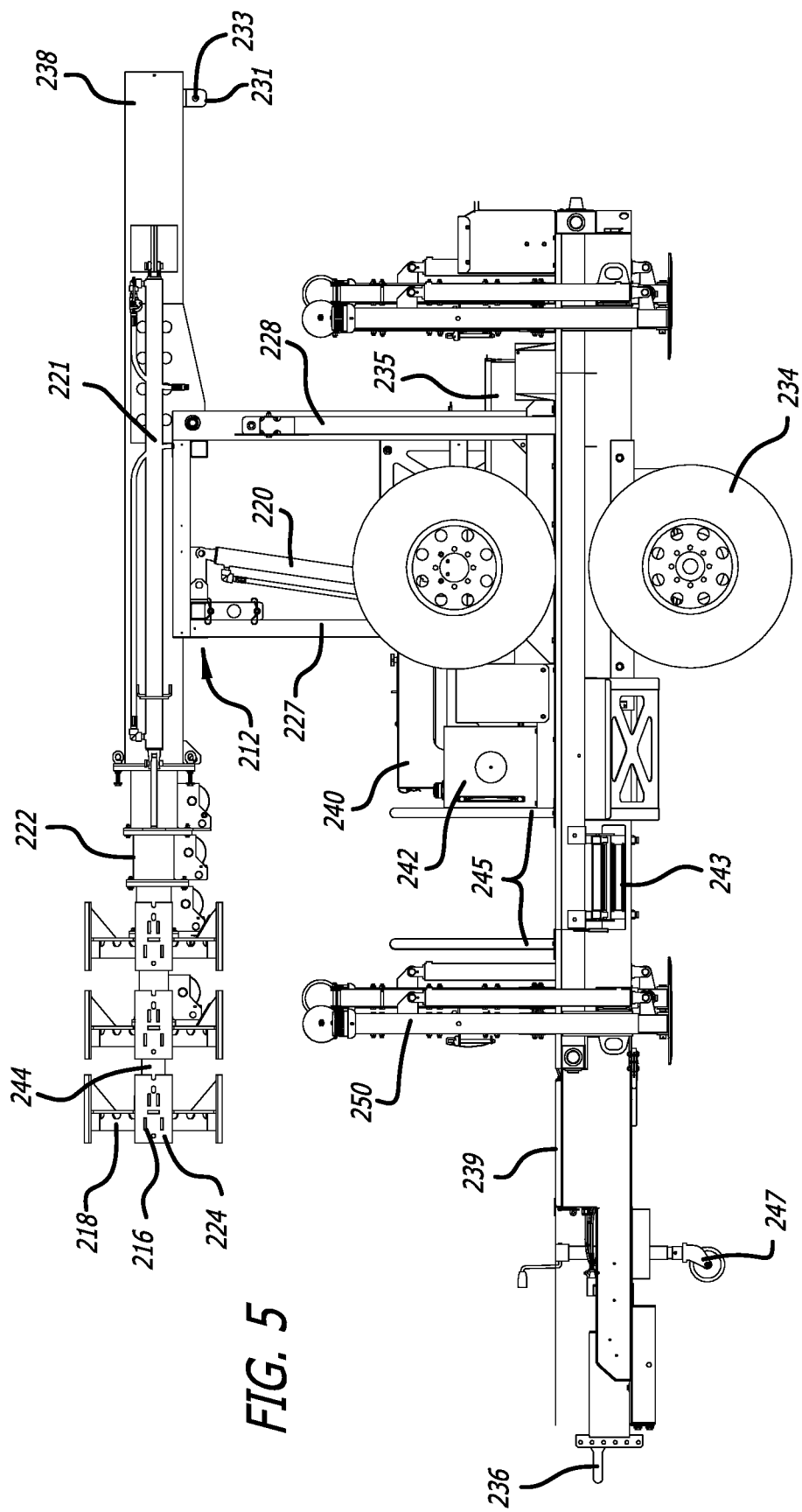
FIG. 5 is a right view of the mobile pole system with the temporary utility pole in a horizontal collapsed position.

As shown in FIGS. 4-5, the mobile structure 230 may, in some embodiments, include a power source 240. The power source 240 may be but is not limited to an electric motor, an electric generator, powered by oil, gas or diesel, and/or an internal combustion engine and may also include an electric battery. It is to be understood that the mobile pole system 200 may use a combination or one or more power sources 240 to operate the mobile pole system 200. The mobile structure 230 may include a hydraulic pump system 242 connected through hydraulic lines to operate the extension and retraction of the temporary utility pole 210, the hydraulic piston 220 and/or a plurality of support members 250. The mobile structure 230 may also include a battery compartment 235 for storing additional batteries for controlling various electronics on the mobile pole system 200. The mobile structure 230 may also have an electrical control panel housed in a control panel box 237. The electrical control panel houses on/off switches between the batteries within the battery compartment 235 and the various electronics of the mobile pole system 200.

The mobile structure 230 may have a flatbed, a set of wheels 234, a jockey wheel 247 and a trailer hitch 236. The flatbed of the mobile structure may be grated, such that fluids or debris that the mobile pole system 200 may encounter will fall through the grates and onto the floor below. The mobile structure 230 may be but is not limited to a wheeled or tracked vehicle or trailer. For example, the mobile structure 230 may be an all-terrain vehicle that may also be amphibious, as shown in FIGS. 13-14. Referring back to FIGS. 4-5, located on the front side of the mobile structure 230, behind the trailer hitch 236 may be a storage compartment 239. On either side of the mobile structure 230 there may be a step-up ladder 241. The step-up ladder 241 having a set of steps 243 may be secured to a side of the mobile structure 230, and a set of handles 245 may be secured to or included in the base of the mobile structure 230.

The mobile structure 230 may include an at least one control unit 260, as shown in FIG. 6. The control unit control unit 260 is used to operate the various modular components of the mobile pole system 200 including but not limited to the temporary utility pole 210, the rotational orientation of the temporary utility pole 210 through the hydraulic piston 220 and the plurality of support members 250. In one embodiment, the control unit 260 includes a wireless or wired communications unit separate from the mobile structure 230 that includes a radio frequency transmitter for wirelessly controlling or otherwise sending control instructions to the mobile pole system 200 including the mobile telescoping utility pole 210 and the plurality of support members 250. The control unit 260 may have a plurality of switches 249 that control flow of the hydraulic fluid to each of the modular components.

Figure 7:
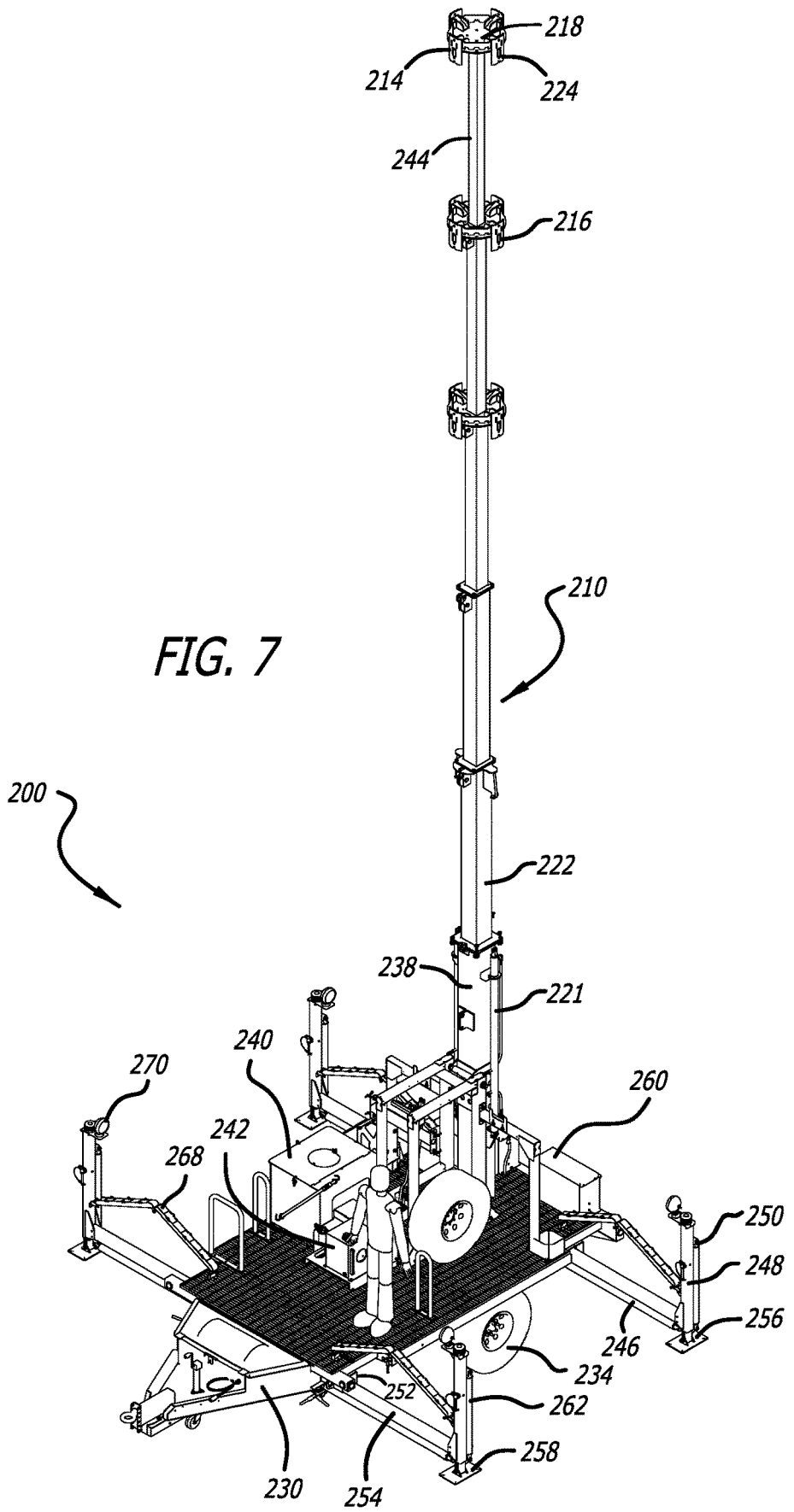
FIG. 7 is a front perspective view of the mobile pole system with the temporary utility pole in the vertical extended position.
Figure 8:
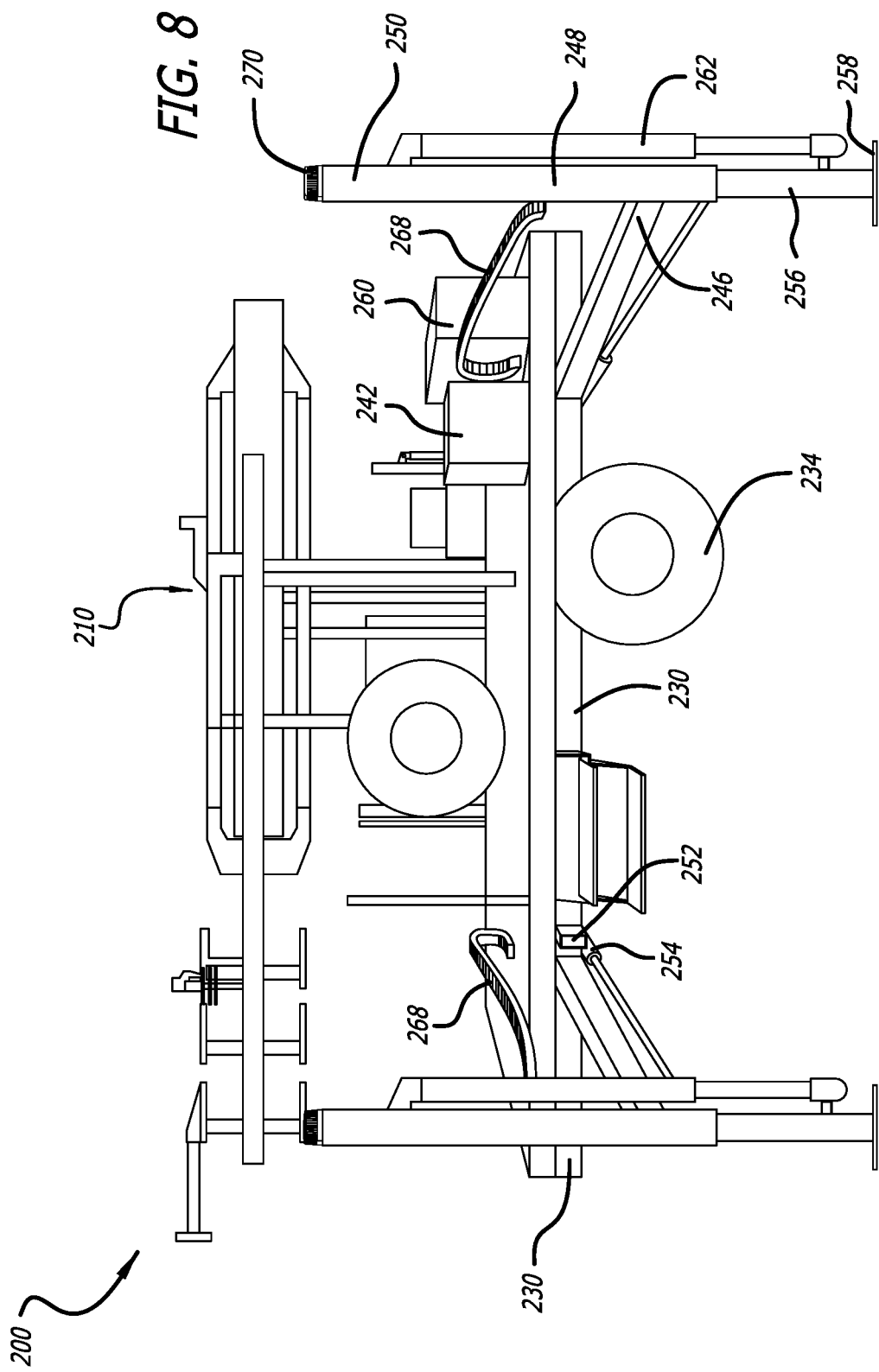
FIG. 8 is a right view of the mobile pole system with the temporary utility pole in the horizontal collapsed position.
Figure 9A:
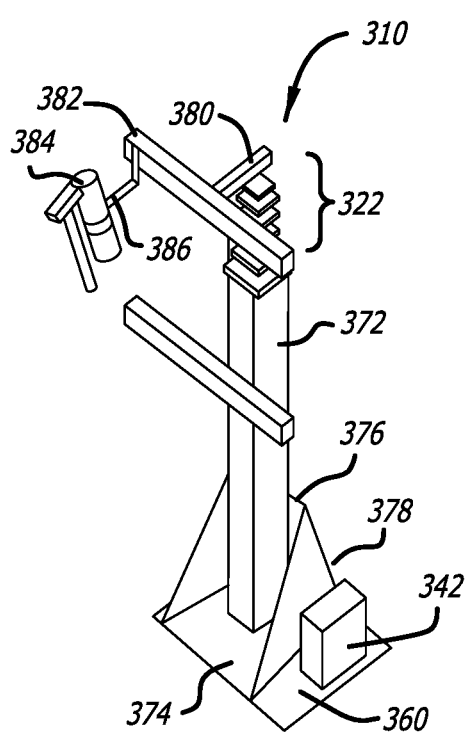
FIG. 9A is a front perspective view of a temporary utility pole in a collapsed position.
Figure 9B:
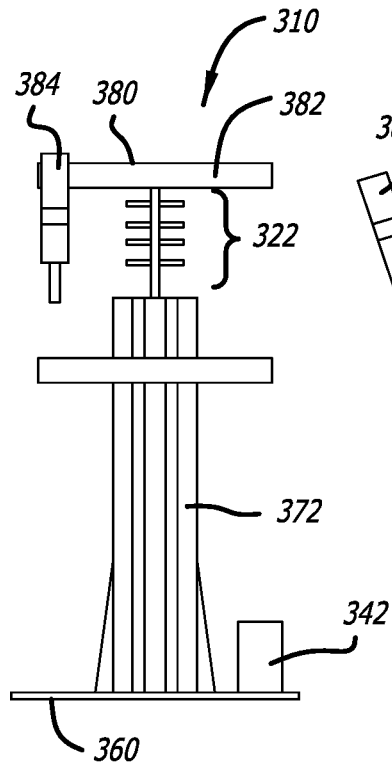
FIG. 9B is a front view of the temporary utility pole in a collapsed position.
Figure 9C:
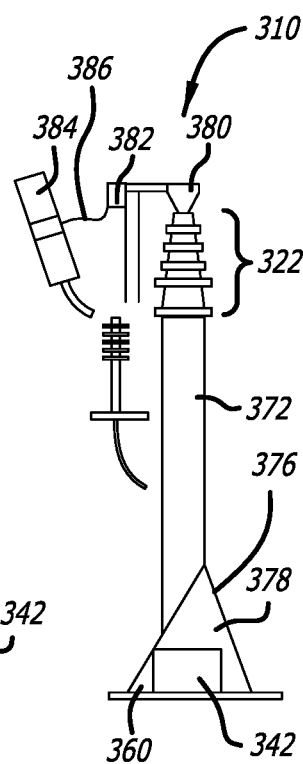
FIG. 9C is a left view of the temporary utility pole in a collapsed position.
Figure 9D:
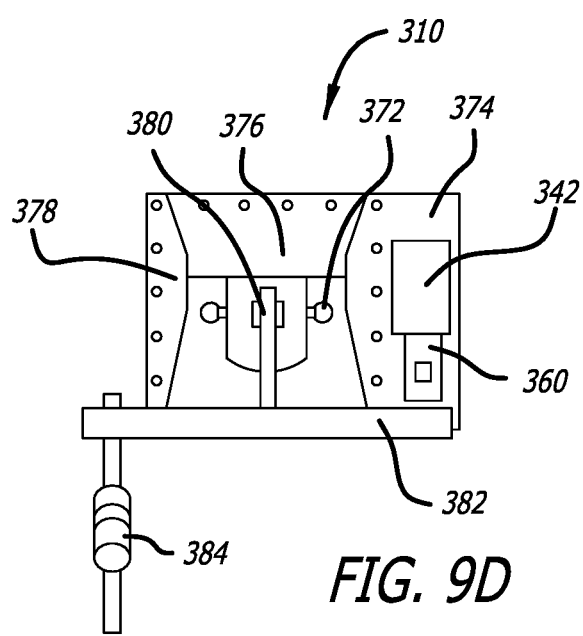
FIG. 9D is a top view of the temporary utility pole in a collapsed position.

Referring now to FIGS. 7-8, the plurality of support members 250 may be formed by an extension beam 246, and an upright 248. The extension beam 246 is secured to the underside of the mobile structure 230, such that it may be retracted and extended from an extension slot 252. The extension slot 252 extends the lateral length of the mobile structure. The extension slot 252 may be located at the front and rear of the mobile structure 230, such that the plurality of support members 250 extend from each corner of the mobile structure 230. It is to be understood that there may be an equal number of extension slots 252 as there are a plurality of support members 250. For example, the embodiment shown has four support members 250 and subsequently has four respective extension slots 252. Attached to the distal end of the extension beam is the upright 248. The upright may be removably secured to the extension beam 246. A hydraulic piston 254 is secured to the mobile structure 230 at one end and is secured to the upright 248 at the opposite end. The hydraulic piston 254 controls the extension and retraction of the plurality of support members 250 from the mobile structure 230. The hydraulic piston 254 is of a fixed length such that the extension beam 246 remains within the extension slot 252.

The upright 248 may be formed to have an upright extension 256. The upright extension 256 is interposed within the upright 248 such that the upright extension may extend and retract from the upright 248. Pivotally secured to the distal end of the upright extension 256 is a foot 258. The foot 258 may be but is not limited to a square shape, or alternative shapes suitable to provide sufficient contact with the ground, road or other surface. For example, the upright extension 256 is to be lowered such that the foot 258 contacts the ground, the larger the surface area of the foot 258 the more traction the foot 258 can gain. The foot 258 is pivotally attached to the upright extension 256 to accommodate uneven surfaces. A vertical hydraulic piston 262 is secured to the upright 248 at one end and is attached to the end of the upright extension 256. The vertical hydraulic piston 262 controls the extension and retraction of the upright extension 256. In this way, the plurality of support members 250 may orient the mobile pole system vertically by way of the upright extension 256 and horizontally by way of the extension beam 246, to be level. For example, if the mobile pole system 200 is positioned on an uneven surface, the plurality of support members 250 may be manipulated to level the mobile pole structure 200 on the uneven surface. The plurality of support members 250 may be powered by the power source 240 and connected to the hydraulic pump system 242 and controlled by the control unit 260. It is to be understood that the plurality of support members 250 may have a separate power source, hydraulic pump system and control unit. The control unit 260 may manipulate the hydraulic piston 254 and the vertical hydraulic piston 262 interconnected by a plurality of hydraulic lines 268 with the hydraulic pump system 242.

The plurality of support members 250 may be made from steel or equivalent material capable of withstanding the vertical force and/or horizontal forces encountered when the hydraulic piston 254 and/or the vertical hydraulic piston 262 are extended or retracted.

Secured at the distal end of the upright 248, opposite the foot 258, and/or on other areas of the mobile structure 230 may be one or more light units 270. The light units 270 may have but are not limited to a strobe light, spotlight or a combination thereof. A benefit of the light units 270 is to serve as a visual safety indicator and/or be a light source. For example, when an operator is extending or retracting the plurality of support members or extending the temporary utility pole 210, the light units 270 may be turned on to serve as a precautionary measure to passersby, as well as utility company workers, to indicate the mobile pole system 200 is in use. Further, when the light units 270 has a spotlight, an operator may manipulate the spotlight to illuminate the mobile pole system 200 and/or surrounding environment in dimly lit environments. The light units 270 is connected to the power source 240 and a control unit 260.

The mobile pole system 200 may be constructed using durable and corrosion resistant materials such as but not limited to aircraft quality aluminum, galvanized steel, and stainless-steel materials or other sufficiently strong and resilient materials.

Referring now to FIGS. 9A-D, an alternative embodiment of a temporary utility pole 310 is shown. The temporary utility pole 310 is the same temporary utility pole 110 and 210 as discussed in FIGS. 1-8 respectively. The temporary utility pole 310 may be in a fixed upright position. The temporary utility pole 310 is formed by a plurality of telescoping segments 322 that extend and retract vertically. The plurality of telescoping segments 322 may extend or retract vertically through a set of hydraulic pistons 372 secured to plurality of telescoping segments 322. The set of hydraulic pistons 372 are connected to a hydraulic system 342 and a control unit 360. The temporary utility pole 310 may also have a rear wall 376 that extends upward from a base mount 374 and diagonally inward. The rear wall 376 is met by two adjoining side walls 378 that extend upward and diagonally inward from the base mount 374. The benefit of the rear wall 376 and side walls 378 is to encase the lower connection point of the set of hydraulic pistons 373 onto the plurality of telescoping segments 322. For example, when the temporary utility pole 310 is in operation, the rear wall 376 and side walls 278 create a barrier between the temporary utility pole 310 and a person.

Figure 10A:
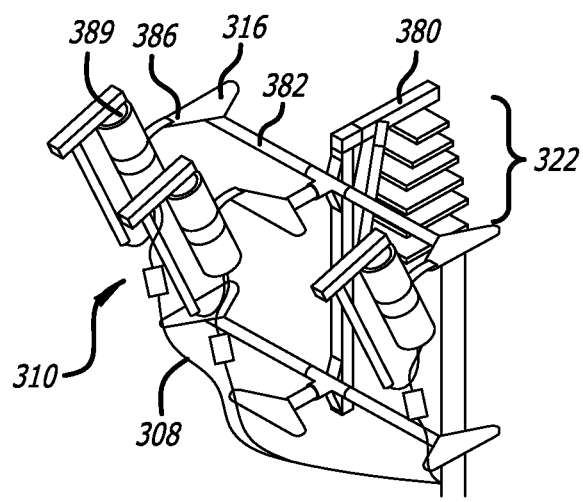
FIG. 10A is a partial front perspective view of the temporary utility pole in a collapsed position.
Figure 10B:
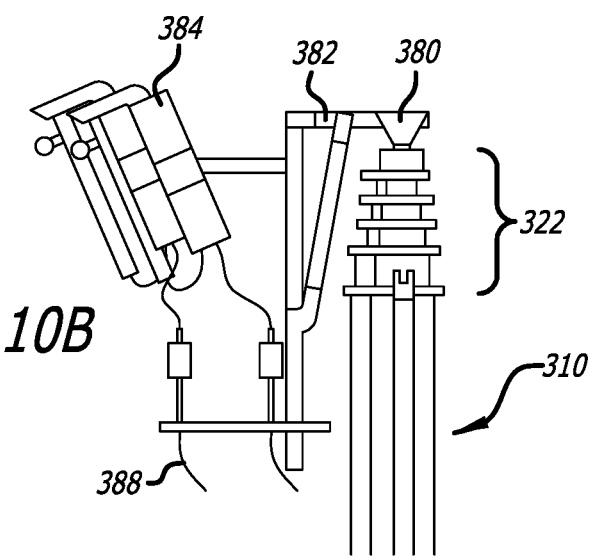
FIG. 10B is a partial left view of the temporary utility pole in a collapsed position.
Figure 10C:
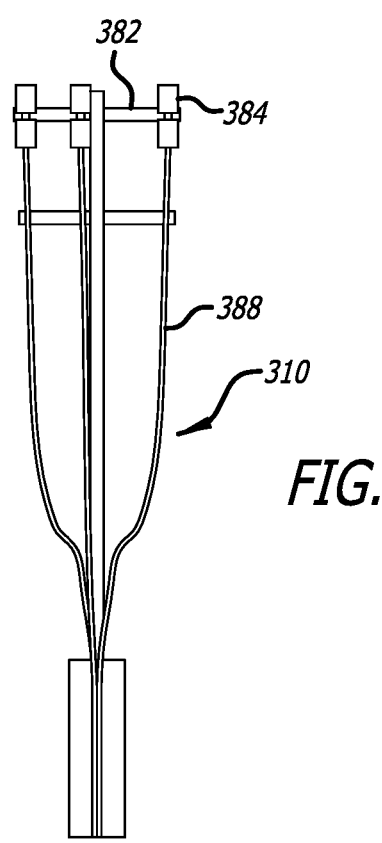
FIG. 10C is a partial front view of the temporary utility pole in an extended position.

The temporary utility pole 310 may have a mount 380. The mount 380 is secured to the distal end of the temporary utility pole 310 and extends outwardly away from the temporary utility pole 310. The mount 380 then extends downwardly. Secured to the mount 380 is at least one crossbar 382. The crossbar 382 extends bilaterally outward from the mount 380. The crossbar 382 may be used to secure utility equipment such as a transformer 384. It is to be understood that other utility equipment may be secured to the crossbar 382. As shown in FIGS. 10A-C, the at least one crossbar 382 may have different shapes. The crossbars 382 are cylindrical in shape further having a mounting plate 386 secured at distal ends of the crossbar. The mounting plate 386 may have an at least one slotted hole 316 to secure a transformer 384, shown, or other utility equipment. Alternatively or additionally, the slotted hole 316 may also secure feed lines 388.

Figure 11:
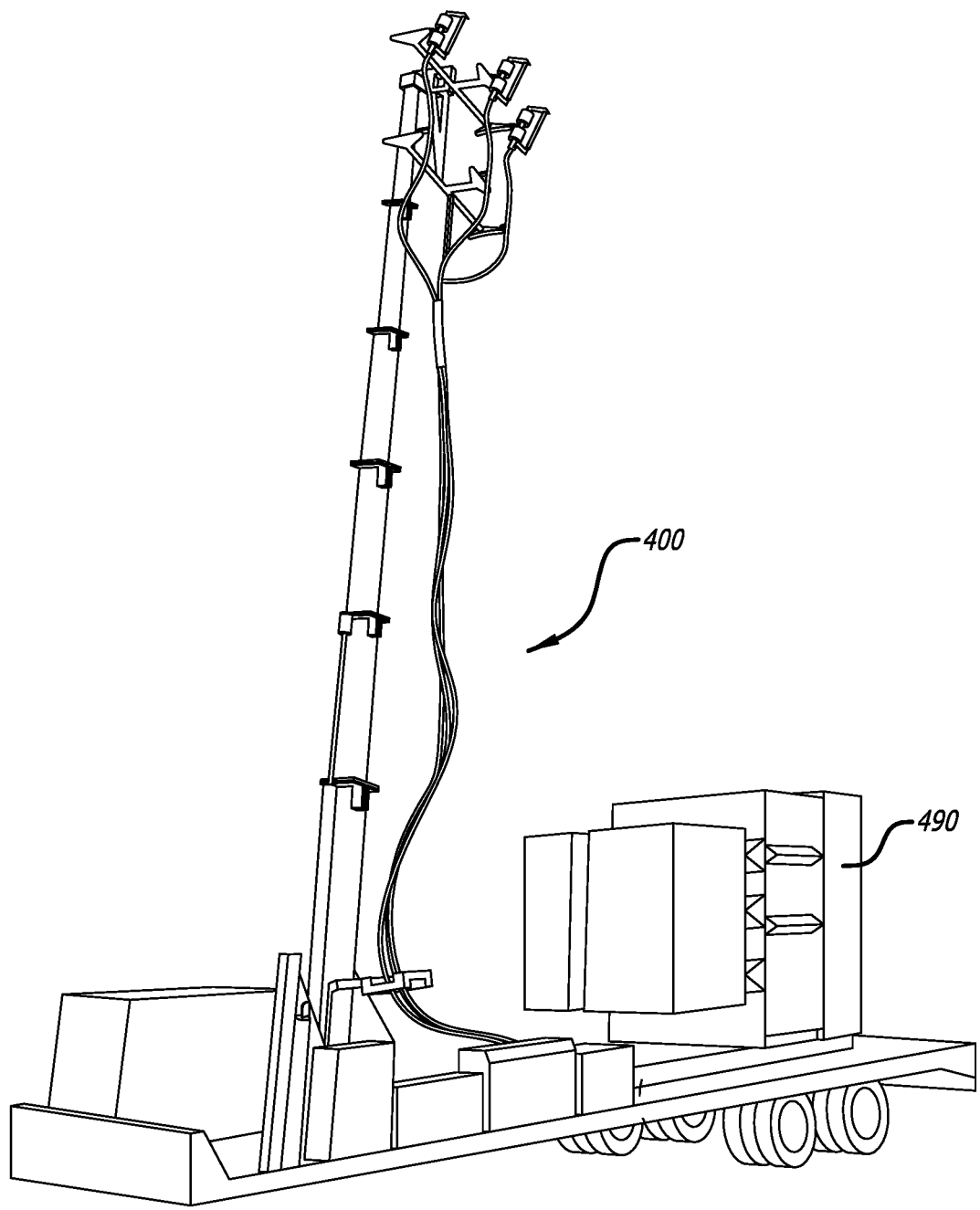
FIG. 11 is a front perspective view of the mobile pole system with the temporary utility pole in a vertical extended position.

Referring now to FIG. 11, an embodiment of a mobile pole system 400 that includes a transformer 490 is shown. The mobile pole system 400 is the same mobile pole system 100 and 200 as described regarding and shown in FIGS. 1-9 with the addition of a transformer 490. A benefit of having a pad mounted transformer 490 included with the mobile pole system 400 is to facilitate power to end consumers when a utility power line is being serviced. For example, when a utility pole is being replaced that disrupts the power to end consumers, the mobile pole system 400 uses the pad mounted transformer 490 to step down the electricity in the related power lines to a lower secondary voltage supplied to the end consumer. In this way, the consumer is supplied power as if no disruption occurred which is an improvement over typical instances of utility maintenance or repair that halt power to the end consumer during said maintenance or repairs.

Figure 12:
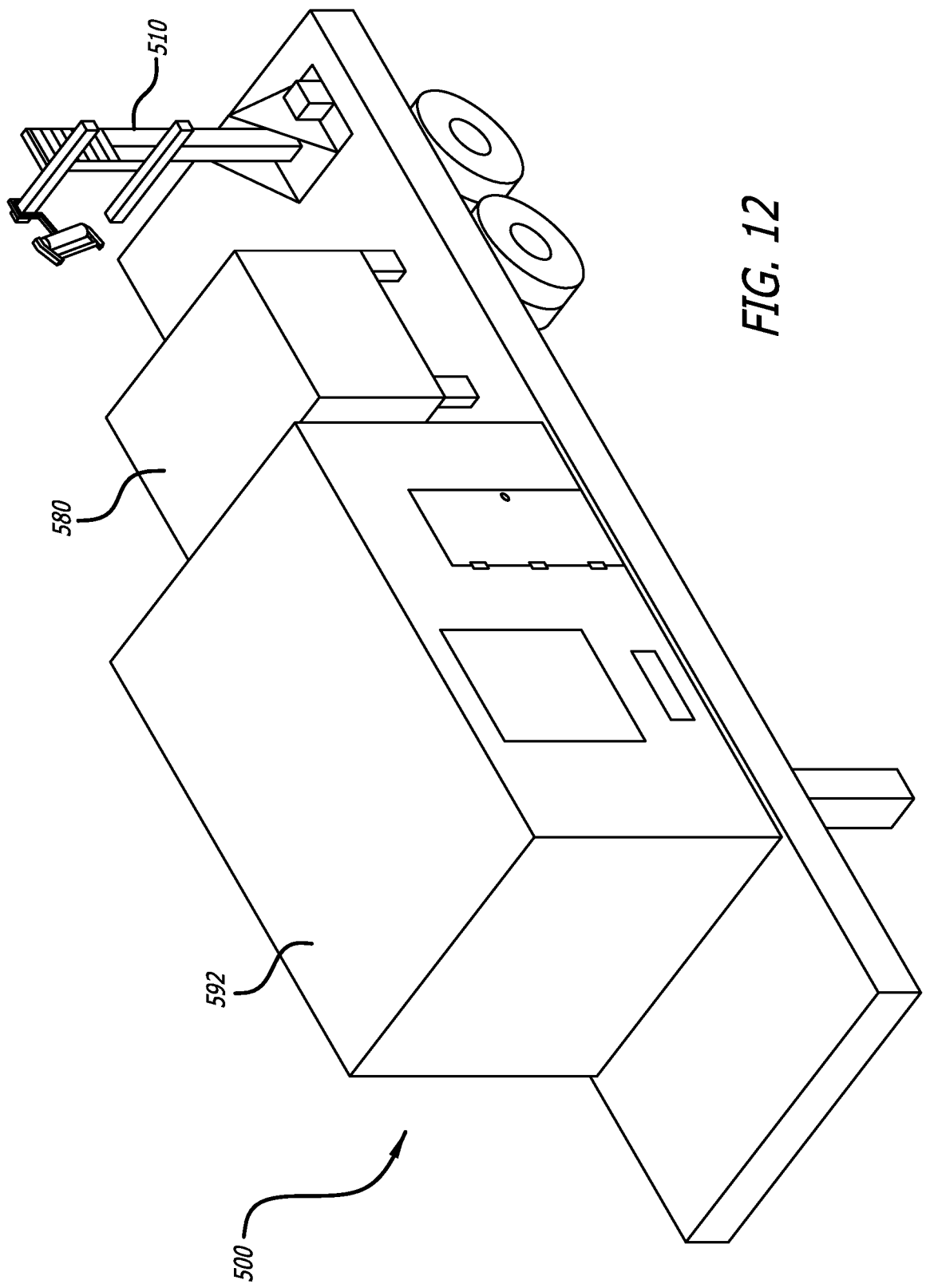
FIG. 12 is a front perspective view of the mobile pole system with the temporary utility pole in a collapsed position.

Referring now to FIG. 12, there is shown an embodiment of a mobile pole system 500 that includes a generator 592 and a pad mounted transformer 590. The inclusion of the generator 592 and the pad mounted transformer 590, together, creates what is commercially referred to as a "Backfeed system." The mobile pole system 500 is the same mobile pole system 100, 200, and 400 as described regarding and shown in FIGS. 1-9 and 17 respectively. A benefit of including a generator 592 to the mobile pole system 500 is to energize or isolate a primary distribution circuit through the use of backfeed from the generator 592 for use as a temporary measure to facilitate the restoration of power during emergency conditions. This process is commercially referred to as "backfeeding." For example, when power is disrupted by a downed power line, the generator 592 supplies sufficient power to the pad mount transformer 590 to step up the electricity that is connected through connected power lines that may be fed back into the power lines connected to a power grid, temporarily restoring power to end users. Preferably, in this embodiment, the temporary utility pole 510 is permanently mounted to a wheeled or tracked vehicle or towable trailer.

Referring now to FIG. 13 there is shown an embodiment of a mobile pole system 600 on or included with an all-terrain amphibious vehicle. The mobile pole system 600 is the same mobile pole system 100, 200, 400 and 500 as discussed in FIGS. 1-9, 11-12 having a different mobile structure or base. The mobile structure 630 of the mobile pole system 600 in this embodiment is an all-terrain amphibious vehicle having a temporary utility pole 610 secured to it.

Referring now to FIG. 14, there is shown an embodiment of a mobile pole system 700 adapted for all-terrain use. The mobile pole system 700 is the same mobile pole system 100, 200, 400, 500 and 600 as discussed in FIGS. 1-9, 11-13 having a different mobile structure or base. The mobile pole system 700 adapted for all-terrain use is on mobile structure trailer 730, includes temporary utility pole 710, and is towed by an all-terrain vehicle 794.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A mobile pole system comprising:
a mobile structure, the mobile structure having at least two wheels, wherein the mobile structure includes a power source and at least one hydraulic actuator;
a temporary utility pole attached to the mobile structure via a hinge, the temporary utility pole having a telescoping mast including a plurality of segments, the telescoping mast extendable to the typical height of a permanent utility pole and configurable to a horizontal position at the hinge when unextended for travel and configurable to a vertical position at the hinge for deployment;
at least one bracket coupled to a segment of the temporary utility pole adapted to receive wires, cables, or an item of utility equipment;
a plurality of supporting members included with the mobile structure, the plurality of supporting members extendable for support of the mobile structure when the temporary utility pole is to be extended and/or is extended.

2. The mobile pole system of claim 1, wherein the telescoping mast is extendable from 11 to 80 feet inclusive.

3. The mobile pole system of claim 1, wherein the mobile structure comprises a transformer mounted thereon and/or a generator mounted thereon for backfeeding electricity to the grid.

4. The mobile pole system of claim 1, wherein the bracket includes a circular disc extending into a plurality of mounting plates having at least one mounting hole adapted to receive the wires, the cables, or the item of utility equipment.

5. The mobile pole system of claim 1, wherein the mobile structure further comprises a control panel.

6. The mobile pole system of claim 5, wherein the telescoping mast engages with the one of the hydraulic actuators to extend and retract the telescoping mast.

7. The mobile pole system of claim 1, wherein the mobile structure is a trailer.

8. The mobile pole system of claim 1, wherein the mobile structure is a vehicle.

9. The mobile pole system of claim 5, wherein the control panel includes or is coupled with a wireless communication unit allowing for remote control of the mobile pole system.

10. The mobile pole system of claim 5, wherein the plurality of support members engage with one of the hydraulic actuators to extend and retract the plurality of support members.

11. A mobile pole system comprising:
a temporary utility pole having a retractable mast wherein the retractable mast is formed by a plurality of cascading segments the retractable mast extendable to the typical height of a permanent utility pole;
at least one bracket coupled to one of the cascading segments configured to receive wires, cables or an item utility equipment;
a plurality of extendable support members;
a mobile structure having a power source and hydraulic pump system;
wherein the temporary utility pole is pivotally secured to the mobile structure;
wherein the plurality of support members are configured to extend from and retract to the mobile structure.

12. The mobile pole system of claim 11, wherein the bracket is formed by a circular disc extending into a plurality of mounting plates having at least one mounting hole configured to receive the wires, the cables or the item utility equipment.

13. The mobile pole system of claim 11, wherein the retractable mast is coupled with the hydraulic pump system to raise and lower the retractable mast in response to a controller.

14. The mobile pole system of claim 11, wherein the plurality of support members are hydraulically engaged with the hydraulic pump system to extend and retract the plurality of support members.

15. The mobile pole system of claim 11, wherein the mobile structure comprises a transformer mounted thereon and/or a generator mounted thereon for backfeeding electricity to the grid.

* * * * *